(12) United States Patent
Suga et al.

(10) Patent No.: US 11,324,079 B2
(45) Date of Patent: May 3, 2022

(54) INDUCTION HEATING COOKER

(71) Applicant: Mitsubishi Electric Corporation, Tokyo (JP)

(72) Inventors: Ikuro Suga, Tokyo (JP); Jun Bunya, Tokyo (JP); Miyuki Takeshita, Tokyo (JP); Kazuhiro Kameoka, Fukaya (JP)

(73) Assignee: Mitsubishi Electric Corporation, Tokyo (JP)

(*) Notice: Subject to any disclaimer, the term of this patent is extended or adjusted under 35 U.S.C. 154(b) by 422 days.

(21) Appl. No.: 16/479,488

(22) PCT Filed: Mar. 24, 2017

(86) PCT No.: PCT/JP2017/012051
§ 371 (c)(1),
(2) Date: Jul. 19, 2019

(87) PCT Pub. No.: WO2018/173262
PCT Pub. Date: Sep. 27, 2018

(65) Prior Publication Data
US 2020/0008272 A1  Jan. 2, 2020

(51) Int. Cl.
*H05B 6/06* (2006.01)
*H05B 6/12* (2006.01)
(Continued)

(52) U.S. Cl.
CPC ........ *H05B 6/065* (2013.01); *H02M 7/53871* (2013.01); *H05B 6/1272* (2013.01); *H05B 2213/05* (2013.01)

(58) Field of Classification Search
CPC ............. H02M 7/4815; H02M 7/4818; H02M 7/53871; H05B 2213/05; H05B 6/062;
(Continued)

(56) References Cited

U.S. PATENT DOCUMENTS

2008/0164249 A1* 7/2008 Gil .................... H05B 6/062
219/620
2011/0192835 A1* 8/2011 Lee .................... H05B 6/12
219/621
2021/0227644 A1* 7/2021 Bunya ................ H05B 6/1272

FOREIGN PATENT DOCUMENTS

JP    2007-194228 A    8/2007
JP    2011-216501 A    10/2011
(Continued)

OTHER PUBLICATIONS

International Search Report of the International Searching Authority dated Apr. 25, 2017 for the corresponding International application No. PCT/JP2017/012051 (and English translation).
(Continued)

*Primary Examiner* — Quang T Van
(74) *Attorney, Agent, or Firm* — Posz Law Group, PLC

(57) ABSTRACT

An induction heating cooker includes a first coil, a second coil, a third coil, a first inverter circuit configured to supply a first high-frequency current to the first coil, a second inverter circuit configured to supply a second high-frequency current to the second coil, a third inverter circuit configured to supply a third high-frequency current to the third coil, a controller, and a load determining unit configured to determine a material of a heating object, wherein when a material of the heating object placed above the first coil is a magnetic material and a material of the heating object placed above the second coil includes a non-magnetic material, the controller operates the first inverter circuit and the second inverter circuit, and stops an operation of the third inverter circuit, and controls such that a frequency of the second high-frequency current is higher than a frequency of the first high-frequency current.

11 Claims, 11 Drawing Sheets

(51) Int. Cl.
H05B 6/68 (2006.01)
H02M 7/5387 (2007.01)

(58) Field of Classification Search
CPC ...... H05B 6/065; H05B 6/1272; Y02B 40/00; Y02B 70/10
USPC ....... 219/678, 690, 695, 693, 696, 698, 697, 219/750, 756, 761, 762
See application file for complete search history.

(56) References Cited

FOREIGN PATENT DOCUMENTS

| JP | 2011-258339 A | 12/2011 |
| JP | 2012-109210 A | 6/2012 |
| JP | 5213937 B2 | 6/2013 |
| JP | 2013-157162 A | 8/2013 |

OTHER PUBLICATIONS

Chinese Office Action dated Apr. 6, 2021, issued in corresponding Chinese Patent Application No. 201780086336.6 (and English Machine Translation).

* cited by examiner

INDUCTION HEATING COOKER

CROSS REFERENCE TO RELATED APPLICATION

This application is a U.S. national stage application of PCT/JP2017/012051 filed on Mar. 24, 2017, the contents of which are incorporated herein by reference.

TECHNICAL FIELD

The present invention relates to an induction heating cooker having a plurality of coils.

BACKGROUND ART

Existing induction heating cookers include a plurality of heating coils, in which the heating coil over which a heating object is not placed is supplied with electric power smaller than electric power applied to the heating coil over which a heating object is placed (for example, see Patent Literature 1).

CITATION LIST

Patent Literature

Patent Literature 1: Japanese Patent No. 5213937

SUMMARY OF INVENTION

Technical Problem

Some heating objects to be heated by an induction heating cooker are made of a composite material of a non-magnetic metal with a magnetic metal attached thereto. An example of such a heating object is a "frying pan with a metal-coated bottom" made of a frying pan of a non-magnetic aluminum material with a magnetic metal such as stainless steel being attached to the center of the bottom of the frying pan. In a typical heating object made of a composite material, a magnetic material is attached to the flat center portion of the non-magnetic bottom surface, but a curved outer peripheral portion of the bottom surface has no magnetic material.

However, while changing power distribution for each of the heating coils depending on an outer diameter of the heating object, the induction heating cooker disclosed in Patent Literature 1 performs no control depending on a material of the heating object. Therefore, when the heating object made of a composite material is inductively heated, the induction heating suitable for the material and shape of the heating object cannot be achieved, resulting in unevenness in heating temperature and a reduction in heating efficiency.

An object of the present invention, which has been made to solve the above problems, is to obtain an induction heating cooker making it possible to suppress unevenness in heating temperature and a reduction in heating efficiency when a heating object made of a composite material is inductively heated.

Solution to Problem

An induction heating cooker of an embodiment of the present invention includes a first coil, a second coil arranged outside the first coil, a third coil arranged outside the second coil, a first inverter circuit configured to supply a first high-frequency current to the first coil, a second inverter circuit configured to supply a second high-frequency current to the second coil, a third inverter circuit configured to supply a third high-frequency current to the third coil, a controller configured to control driving of the first inverter circuit, the second inverter circuit, and the third inverter circuit, and a load determining unit configured to determine a material of a heating object placed above each of the first coil, the second coil and the third coil, wherein when a material of the heating object placed above the first coil is a magnetic material and a material of the heating object placed above the second coil includes a non-magnetic material, the controller operates the first inverter circuit and the second inverter circuit, and stops an operation of the third inverter circuit, and controls such that a frequency of the second high-frequency current is higher than a frequency of the first high-frequency current.

Advantageous Effects of Invention

According to an embodiment of the present invention, when a material of the heating object placed above the first coil is a magnetic material and a material of the heating object placed above the second coil includes a non-magnetic material, the controller operates the first inverter circuit and the second inverter circuit, and stops an operation of the third inverter circuit, and controls such that a frequency of the second high-frequency current is higher than a frequency of the first high-frequency current.

Therefore, it is possible to perform the induction heating suitable for the material of the heating object and suppress unevenness in heating temperature when the heating object made of a composite material is inductively heated. Furthermore, unnecessary electric power is not input to the curved outer peripheral portion in the bottom surface of the heating object, thereby suppressing a reduction in heating efficiency.

DESCRIPTION OF EMBODIMENTS

Embodiment 1

Figure 1:
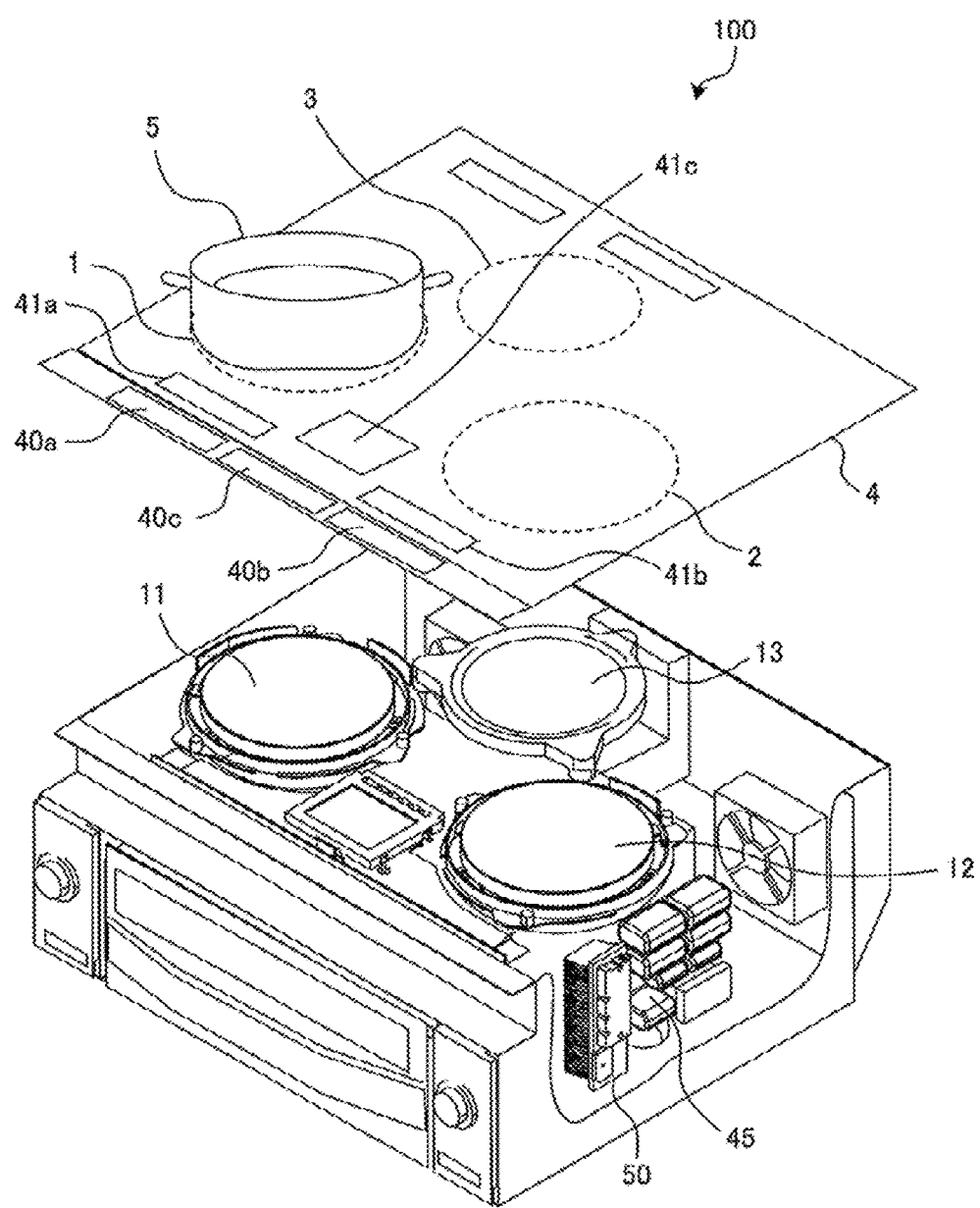
FIG. 1 is an exploded perspective view illustrating an induction heating cooker according to Embodiment 1.

FIG. 1 is an exploded perspective view illustrating an induction heating cooker according to Embodiment 1.

As illustrated in FIG. 1, an upper portion of an induction heating cooker 100 includes a top plate 4 on which a heating object 5 such as a pot is placed. The top plate 4 includes a first induction heating zone 1 and a second induction heating zone 2 as heating zones for inductivity heating the heating object 5. The first induction heating zone 1 and the second induction heating zone 2 are laterally arranged side by side in an area close to a front edge of the top plate 4. The induction heating cooker 100 according to Embodiment 1 also includes a third induction heating zone 3 as a third heating zone. The third induction heating zone 3 is located behind the first induction heating zone 1 and the second induction heating zone 2 and in a substantially central area in the lateral direction of the top plate 4.

Under the first induction heating zone 1, the second induction heating zone 2, and the third induction heating zone 3, a first induction heating unit 11, a second induction heating unit 12, and a third induction heating unit 13 are provided, respectively, each of which heats a heating object placed on the corresponding heating zone. Each of the heating units includes coils (see FIG. 2).

The entire top plate 4 is made of an infrared transmitting material such as heat-resistant reinforced glass or crystallized glass. On the top plate 4, circular pot position marks roughly indicating pot placement positions are formed by painting or printing, for example, corresponding to respective heating areas (heating zones) of the first induction heating unit 11, the second induction heating unit 12, and the third induction heating unit 13.

An operation unit 40 is provided closer to the front edge of the top plate 4, the operation unit 40 serving as an input device for setting heating power to be input (electric power to be input) and a cooking menu (such as boiling mode or frying mode) when the heating power is applied to the heating object 5 using the corresponding one of the first induction heating unit 11, the second induction heating unit 12, and the third induction heating unit 13. In Embodiment 1, the operation unit 40 is divided into an operation unit 40a, an operation unit 40b, and an operation unit 40c, which are provided for the respective induction heating coils.

A display unit 41 is provided as a notification unit, near the operation unit 40. The display unit 41 displays information such as an operating state of each of the induction heating coils, and details of an operation and an input from the operation unit 40. In Embodiment 1, the display unit 41 is divided into a display unit 41a, a display unit 41b, and a display unit 41c, which are provided for the respective induction heating coils.

It should be noted that each of the operation unit 40 and the display unit 41 is not limited to the case where it is divided into operation or display units which are provided for the respective induction heating units or the case where it is shared among the induction heating units. The operation unit 40 includes, for example, a mechanical switch such as a push switch or a tactile switch, or a touch switch for detecting an input operation based on a change in electrode capacitance. Also, the display unit 41 includes, for example, a liquid crystal device (LCD) or an LED.

The operation unit 40 and the display unit 41 may be combined into an operation and display unit 43. The operation and display unit 43 includes, for example, a touch panel provided with a touch switch located on an upper surface of an LCD.

The induction heating cooker 100 includes therein drive circuits 50 configured to supply high-frequency power to the coils of the first induction heating unit 11, the second induction heating unit 12, and the third induction heating unit 13, and a controller 45 configured to control the operation of the entire induction heating cooker including the drive circuits 50.

When high-frequency power is supplied to the first induction heating unit 11, the second induction heating unit 12, and the third induction heating unit 13 by the respective drive circuits 50, a high-frequency magnetic field is generated from each of coils of the respective induction heating units. The configuration of each of the drive circuits 50 will be described later in detail.

The first induction heating unit 11, the second induction heating unit 12, and the third induction heating unit 13 are configured as described below, for example. It should be noted that the first induction heating unit 11, the second induction heating unit 12, and the third induction heating unit 13 have the same configuration. Therefore, the configuration will be described by referring to the configuration of the first induction heating unit 11.

Figure 2:
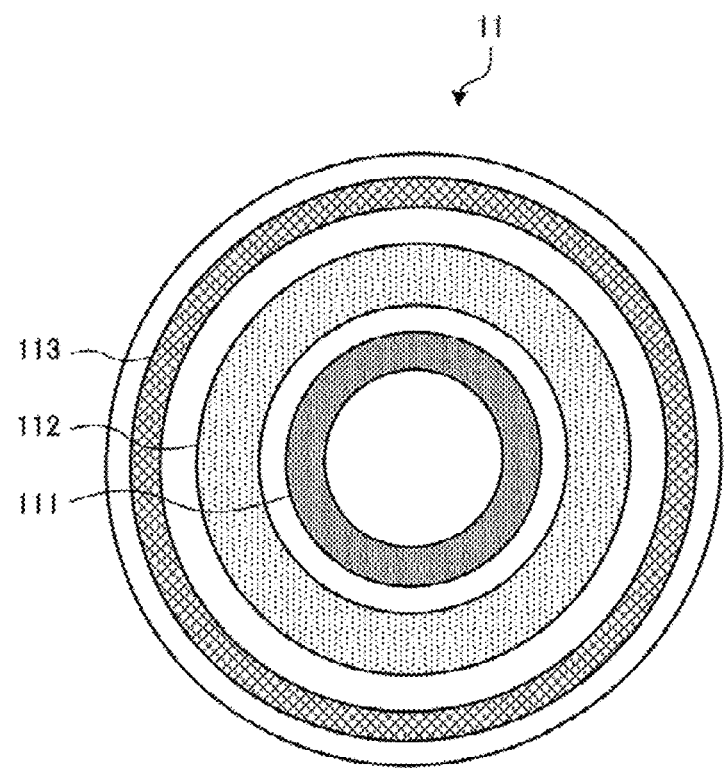
FIG. 2 is a plan view illustrating a first induction heating unit of the induction heating cooker according to Embodiment 1.

FIG. 2 is a plan view illustrating the first induction heating unit of the induction heating cooker according to Embodiment 1.

The first induction heating unit 11 includes a plurality of ring-shaped coils that are concentrically arranged and are different from one another in diameter. FIG. 2 illustrates the first induction heating unit 11 made up of three ring-shaped coils, for example. The first induction heating unit 11 includes an inner-peripheral heating coil 111 arranged at the center of the heating zone, an intermediate heating coil 112 arranged outside the inner-peripheral heating coil 111, and an outer-peripheral heating coil 113 arranged outside the intermediate heating coil 112 and in an outermost periphery of the first induction heating unit 11.

Each of the inner-peripheral heating coil 111, the intermediate heating coil 112, and the outer-peripheral heating coil 113 is independently wound. The inner-peripheral heating coil 111, the intermediate heating coil 112, and the outer-peripheral heating coil 113 are each formed by winding a conductive wire made of an arbitrary insulation-coated metal (for example, copper, aluminum or other metals).

Figure 3:
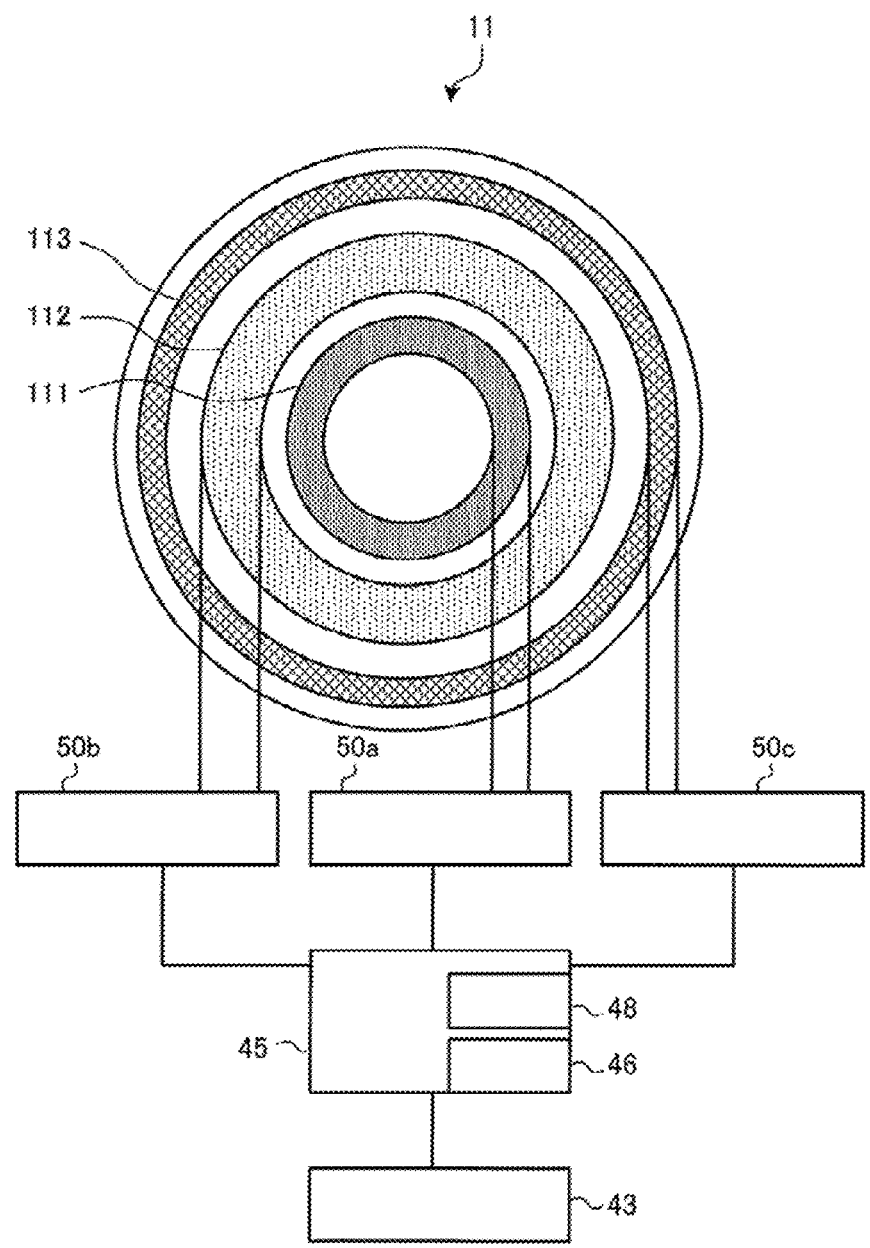
FIG. 3 is a block diagram illustrating a configuration of the induction heating cooker according to Embodiment 1.

FIG. 3 is a block diagram illustrating a configuration of the induction heating cooker according to Embodiment 1.

As illustrated in FIG. 3, the first induction heating unit 11 is controlled to be driven by drive circuits 50a, 50b, and 50c. More specifically, the inner-peripheral heating coil 111 is controlled to be driven by the drive circuit 50a. The intermediate heating coil 112 is controlled to be driven by the drive circuit 50b. The outer-peripheral heating coil 113 is controlled to be driven by the drive circuit 50c.

Due to supply of a high-frequency current by the drive circuit 50a to the inner-peripheral heating coil 111, a high-frequency magnetic field is generated from the inner-peripheral heating coil 111. When a high-frequency current is supplied by the drive circuit 50b to the intermediate heating coil 112, a high-frequency magnetic field is generated from the intermediate heating coil 112. When a high-frequency current is supplied by the drive circuit 50c to the outer-peripheral heating coil 113, a high-frequency magnetic field is generated from the outer-peripheral heating coil 113.

The controller 45 includes dedicated hardware or a central processing unit (CPU, and also referred to as a processing unit, arithmetic unit, microprocessor, microcomputer, or processor) that executes a program stored in a memory 48. The controller 45 includes a load determining unit 46 configured to determine a material of the heating object 5 placed above each of the inner-peripheral heating coil 111, the intermediate heating coil 112, and the outer-peripheral heating coil 113.

In the case where the controller 45 is dedicated hardware, the controller 45 corresponds to, for example, a single circuit, a composite circuit, an application specific integrated circuit (ASIC), a field-programmable gate array (FPGA), or a combination of these circuits. As functional units each of which can be implemented by the controller 45, individual hardware may be applied, or single hardware may be applied.

In the case where the controller 45 is a CPU, each of functions performed by the controller 45 is implemented by software, firmware or a combination of software and firmware. The software or firmware is described as a program, and stored in the memory 48. The CPU reads and executes the program stored in the memory 48, thereby performing each function of the controller 45. The memory 48 is, for example, a non-volatile or volatile semiconductor memory such as a RAM, a ROM, a flash memory, an EPROM, or an EEPROM.

The functions of the controller 45 may be partially implemented by dedicated hardware, and may be partially implemented by software or firmware.

Figure 4:
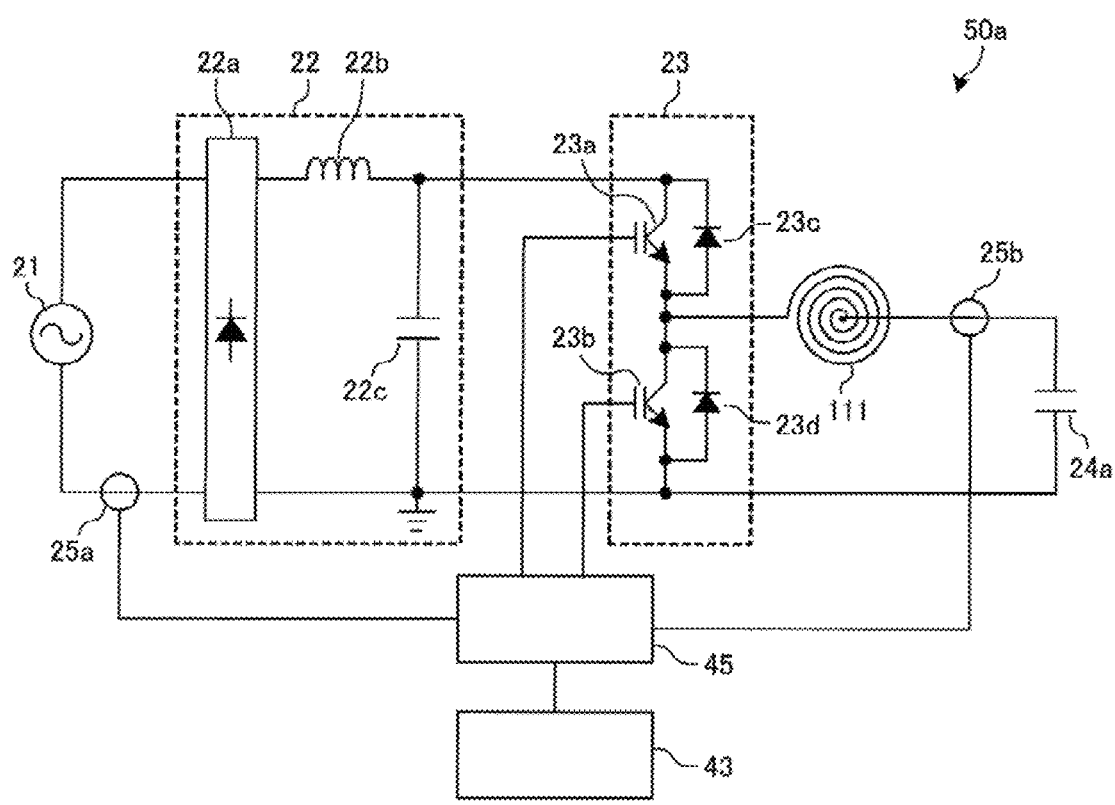
FIG. 4 is a diagram illustrating one of the drive circuits of the induction heating cooker according to Embodiment 1.

FIG. 4 is a diagram illustrating one of the drive circuits of the induction heating cooker according to Embodiment 1.

The drive circuits 50, which are provided for the respective heating units, may have the same circuit configuration, or may have different circuit configurations for the respective heating units. FIG. 4 illustrates the drive circuit 50a that drives the inner-peripheral heating coil 111.

As illustrated in FIG. 4, the drive circuit 50a includes a direct-current power supply circuit 22, an inverter circuit 23, and a resonant capacitor 24a.

An input current detecting unit 25a is constituted by, for example, a current sensor. The input current detecting unit 25a detects current which is input from an alternating-current power supply 21 to the direct-current power supply circuit 22, and outputs a voltage signal corresponding to a value of the input current to the controller 45.

The direct-current power supply circuit 22 includes a diode bridge 22a, a reactor 22b, and a smoothing capacitor 22c. The direct-current power supply circuit 22 converts an alternating-current voltage input from the alternating-current power supply 21 into a direct-current voltage, and outputs the direct-current voltage to the inverter circuit 23.

The inverter circuit 23 is a so-called half-bridge type inverter in which IGBTs 23a and 23b serving as switching elements are connected in series to the output of the direct-current power supply circuit 22. In the inverter circuit 23, diodes 23c and 23d serving as flywheel diodes are connected in parallel to the respective IGBTs 23a and 23b. The IGBT 23a and the IGBT 23b are driven to be turned on and off with drive signals output from the controller 45. The controller 45 outputs drive signals for alternately turning on and off the IGBT 23a and the IGBT 23b, so that the IGBT 23b is deactivated while the IGBT 23a is activated, and the IGBT 23b is activated while the IGBT 23a is deactivated. In this manner, the inverter circuit 23 converts direct-current power output from the direct-current power supply circuit 22 into alternating-current power at a high frequency of approximately 20 to 100 kHz, and supplies the alternating-current power to a resonant circuit made up of the inner-peripheral heating coil 111 and the resonant capacitor 24a.

The resonant capacitor 24a is connected in series to the inner-peripheral heating coil 111. The resonant circuit has a resonant frequency which depends on factors such as the inductance of the inner-peripheral heating coil 111 and the capacitance of the resonant capacitor 24a. The inductance of the inner-peripheral heating coil 111 changes with a characteristic of the heating object 5 (a metal load) when the heating object 5 is magnetically coupled to the inner-peripheral heating coil 111, and the resonant frequency of the resonant circuit changes with the change in the inductance.

With such a configuration, a high-frequency current of approximately tens of amperes flows through the inner-peripheral heating coil 111, and the heating object 5 placed on the top plate 4 immediately above the inner-peripheral heating coil 111 is inductively heated by the high-frequency magnetic flux generated by the flowing high-frequency current. Each of the IGBTs 23a and 23b serving as switching elements includes, for example, a silicon-based semiconductor, but may be formed by using a wide-bandgap semiconductor made of a silicon carbide-based material or a gallium nitride-based material.

In the case where wide-bandgap semiconductors are used as the switching elements, the following advantages are obtained: power supply loss of the switching elements can be reduced; and since heat dissipation from the drive circuit is satisfactory even when the switching frequency (driving frequency) is set to be high (high speed), radiation fins of the drive circuit can be smaller, and the drive circuit can be also smaller and cost can be reduced.

A coil current detecting unit 25b is connected to the resonant circuit made up of the inner-peripheral heating coil 111 and the resonant capacitor 24a. The coil current detecting unit 25b includes, for example, a current sensor. The coil current detecting unit 25b detects a current flowing through the inner-peripheral heating coil 111, and outputs a voltage signal corresponding to a value of the coil current to the controller 45.

The drive circuit 50a that drives the inner-peripheral heating coil 111 has been described with reference to FIG. 4. A configuration similar to the configuration of the drive circuit 50a is also applicable to the drive circuit 50b that drives the intermediate heating coil 112 and the drive circuit 50c that drives the outer-peripheral heating coil 113.

The inner-peripheral heating coil 111 corresponds to a "first coil" according to the present invention.

The intermediate heating coil 112 corresponds to a "second coil" according to the present invention.

The outer-peripheral heating coil 113 corresponds to a "third coil" according to the present invention.

The drive circuit 50a corresponds to a "first inverter circuit" according to the present invention.

The drive circuit 50b corresponds to a "second inverter circuit" according to the present invention.

The drive circuit 50c corresponds to a "third inverter circuit" according to the present invention.

The high-frequency current supplied to the inner-peripheral heating coil 111 from the drive circuit 50a corresponds to a "first high-frequency current" according to the present invention.

The high-frequency current supplied to the intermediate heating coil 112 from the drive circuit 50b corresponds to a "second high-frequency current" according to the present invention.

The high-frequency current supplied to the outer-peripheral heating coil 113 from the drive circuit 50c corresponds to a "third high-frequency current" according to the present invention.

(Operation)

An operation of the induction heating cooker according to Embodiment 1 will be now described.

When the user places the heating object 5 on one of the heating zones and issues an instruction to start heating (input heating power) with the operation and display unit 43, the load determining unit 46 of the controller 45 performs a load determining process.

Figure 5:
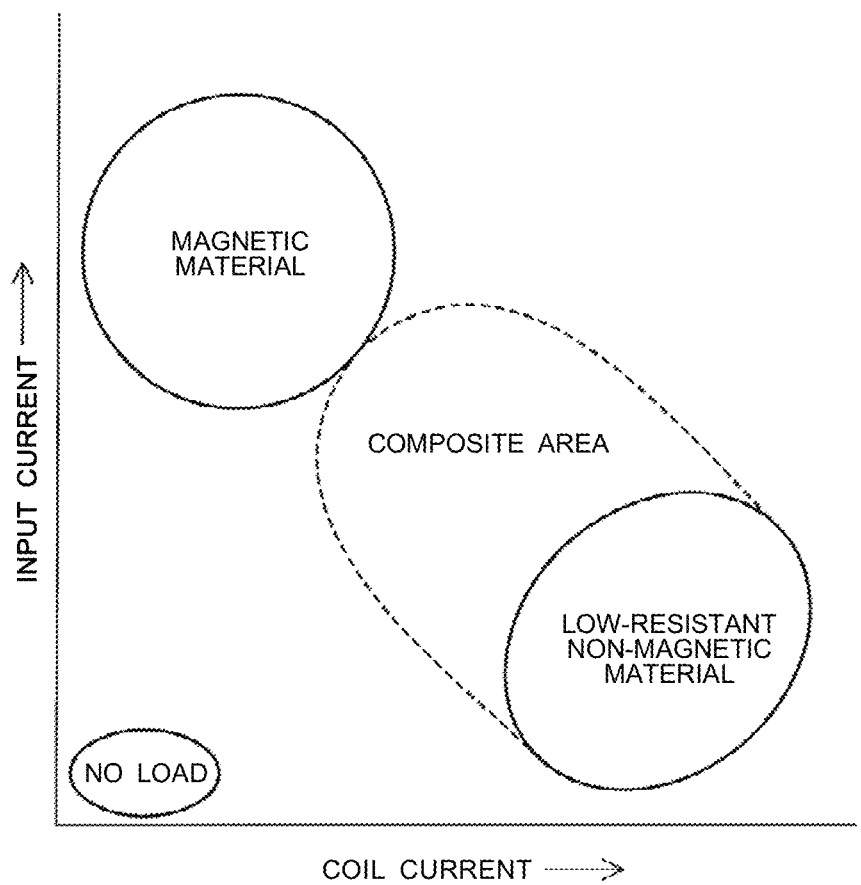
FIG. 5 is a load determining characteristic graph based on the relationship between a coil current and an input current in the induction heating cooker according to Embodiment 1.

FIG. 5 is a load determining characteristic graph based on the relationship between a coil current and an input current in the induction heating cooker according to Embodiment 1.

As shown in FIG. 5, the relationship between the coil current and the input current changes depending on the material of the load placed above each of the inner-peripheral heating coil 111, the intermediate heating coil 112, and the outer-peripheral heating coil 113. The controller 45 previously stores in the memory 48 a load determining table, which is a table of the relationship between the coil current and the input current illustrated in FIG. 5.

In the load determining process, the controller 45 drives the inverter circuit 23 of each of the drive circuits 50a to 50c with a specific drive signal for load determination, and detects the input current from the signal output from the input current detecting unit 25a. At the same time, the controller 45 detects the coil current from the signal output from the coil current detecting unit 25b. The load determining unit 46 of the controller 45 determines the material of the load placed above the coil based on the detected coil current, the detected input current, and the load determining table representing the relationship of FIG. 5.

The material of the heating object 5 serving as a load is broadly classified into a magnetic material such as iron and SUS 430, and a non-magnetic material such as aluminum and copper. Some heating objects 5 are made up of a composite material of a non-magnetic metal with a magnetic metal being attached thereto.

Figure 6:
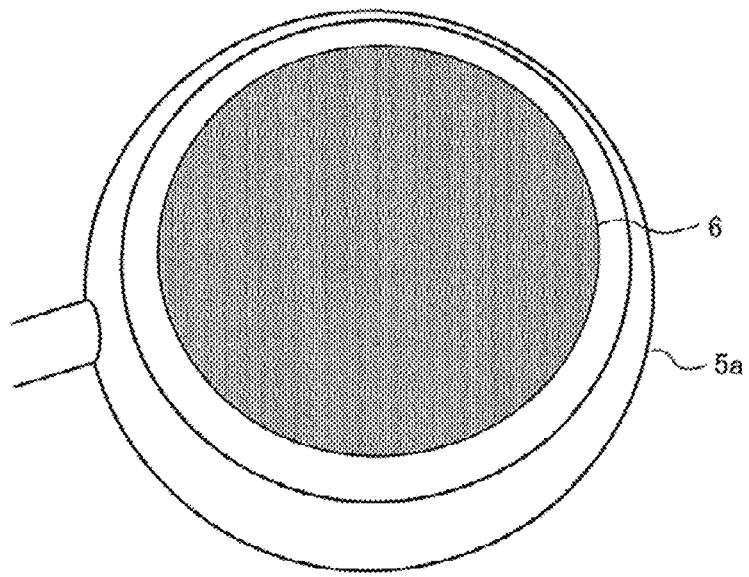
FIG. 6 is a diagram illustrating a heating object made of a composite material to be inductively heated by the induction heating cooker according to Embodiment 1.

FIG. 6 is a diagram illustrating a heating object made of a composite material to be inductively heated by the induction heating cooker according to Embodiment 1. FIG. 6 is a bottom view of a heating object 5a.

As illustrated in FIG. 6, the heating object 5a made of a composite material is formed by, for example, attaching a magnetic material 6 such as stainless steel to a center portion of a bottom of a frying pan made of a non-magnetic material such as aluminum. The magnetic material 6 is attached to the non-magnetic material by any method such as sticking, welding, thermal spraying, pressure bonding, fitting, clinching, and embedding, for example.

In the typical heating object 5a made of a composite material, the magnetic material 6 is attached to the flat central portion of the non-magnetic material-based bottom surface but is not attached to a curved outer peripheral portion in the bottom surface. When such a heating object 5a is placed on the heating zone, the magnetic material and the non-magnetic material are placed above the coil. More specifically, in the load determination, the load characteristic of the coil above which the magnetic material and the non-magnetic material are placed corresponds to a characteristic of a "composite area" between a magnetic material characteristic and a non-magnetic material characteristic as shown in FIG. 5.

Next, the controller 45 controls the drive circuits 50a to 50c according to the result of the load determining process to perform a heating operation in which high-frequency power is supplied according to the heating power to be applied to induction heating.

Hereinafter, a heating operation performed in a case where the heating object 5a made of a composite material is placed on the heating zone of the induction heating cooker 100, and a heating operation performed in a case where the heating object 5b formed only of a magnetic material is placed on the heating zone of the induction heating cooker 100 will be described separately.

<Heating Object 5a Made of Composite Material>

Figure 7:
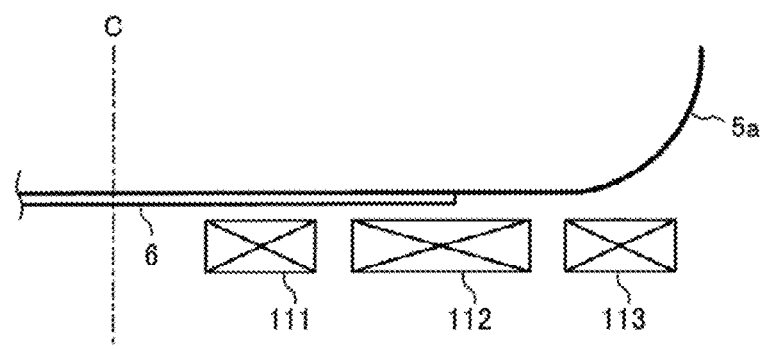
FIG. 7 is a diagram illustrating a heating object and heating coils of the induction heating cooker according to Embodiment 1.

FIG. 7 is a diagram illustrating a heating object and heating coils of the induction heating cooker according to Embodiment 1. FIG. 7 schematically illustrates a longitudinal section of a state in which the heating object 5a made of a composite material is placed on the heating zone. Furthermore, FIG. 7 illustrates the inner-peripheral heating coil 111, the intermediate heating coil 112, and the outer-peripheral heating coil 113 only on the right side from the center C, and does not illustrate the top plate 4.

As illustrated in FIG. 7, when the heating object 5a made of a composite material is placed on the heating zone of the induction heating cooker 100, the load determining unit 46 determines that the magnetic material 6 is placed above the inner-peripheral heating coil 111. Furthermore, the load determining unit 46 determines that the magnetic material 6 is placed above a part of the intermediate heating coil 112 and a non-magnetic material is placed above another part of the intermediate heating coil 112. More specifically, the load determining unit 46 determines that the material of the heating object 5a placed above the intermediate heating coil 112 includes a non-magnetic material.

When the material of the heating object 5a placed above the inner-peripheral heating coil 111 is a magnetic material and the material of the heating object 5a placed above the intermediate heating coil 112 includes a non-magnetic material, the controller 45 operates the drive circuits 50a and 50b and stops the operation of the drive circuit 50c. More specifically, the controller 45 supplies the high-frequency current to the inner-peripheral heating coil 111 and the intermediate heating coil 112, and stops supply of the high-frequency current to the outer-peripheral heating coil 113.

The controller 45 controls such that the frequency of the high-frequency current to be supplied to the intermediate heating coil 112 from the drive circuit 50b is higher than the frequency of the high-frequency current to be supplied to the inner-peripheral heating coil 111 from the drive circuit 50a.

For example, the controller 45 sets the frequency of the high-frequency current to be supplied to the inner-peripheral heating coil 111 from the drive circuit 50a at a frequency set in advance according to the magnetic material, for example, 23 kHz. The controller 45 sets the frequency of the high-frequency current to be supplied to the intermediate heating coil 112 from the drive circuit 50b at a frequency set according to the non-magnetic material, for example, 90 kHz.

The controller 45 controls the heating power (electric power) by changing the on duty (on/off ratio) of the switching element of the inverter circuit 23, thereby to allow the heating object 5 placed on the top plate 4 to be inductively heated.

When a plurality of coils adjacent to one another are driven at the same time, interference noise may be generated, the interference noise corresponding to a difference in driving frequency between the coils. To prevent such interference noise, the controller 45 may control such that the driving frequency of the drive circuit 50b for the intermediate heating coil 112 is higher than the driving frequency of the drive circuit 50a for the inner-peripheral heating coil 111 by not less than the upper limit of the audible frequency range (i.e., by not less than about 20 kHz). For example, when the driving frequency of the drive circuit 50b for the intermediate heating coil 112 varies within a preset range, the lower limit of the driving frequency range of the drive circuit 50b is set to be higher than the upper limit of the driving frequency range of the drive circuit 50a for the inner-peripheral heating coil 111 by 20 kHz. It should be noted that the maximum driving frequency of the intermediate heating coil 112 is, for example, 100 kHz.

Thereby, the interference noise can be prevented from being generated when the inner-peripheral heating coil 111 and the intermediate heating coil 112, which are adjacent to each other, are driven at the same time.

<Heating Object 5b Made of Magnetic Material>

Figure 8:
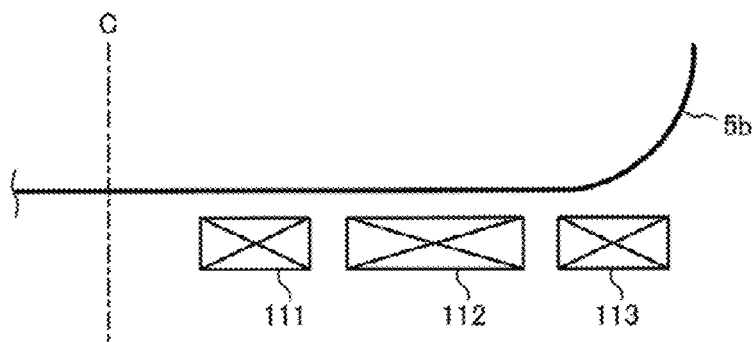
FIG. 8 is a diagram illustrating a heating object and heating coils of the induction heating cooker according to Embodiment 1.

FIG. 8 is a diagram illustrating a heating object and heating coils of the induction heating cooker according to Embodiment 1. FIG. 8 schematically illustrates a longitudinal section of a state in which the heating object 5b formed only of a magnetic material is placed on the heating zone. Furthermore, FIG. 8 illustrates the inner-peripheral heating coil 111, the intermediate heating coil 112, and the outer-peripheral heating coil 113 only on a side closer to the right from the center C, and does not illustrate the top plate 4.

As illustrated in FIG. 8, when the heating object 5b formed only of a magnetic material is placed on the heating zone of the induction heating cooker 100, the load determining unit 46 determines that the magnetic material is placed above the inner-peripheral heating coil 111, the intermediate heating coil 112, and the outer-peripheral heating coil 113.

The controller 45 allows each of the drive circuits 50a to 50c to operate. More specifically, the high-frequency current is supplied to each of the inner-peripheral heating coil 111, the intermediate heating coil 112, and the outer-peripheral heating coil 113.

The controller 45 sets the driving frequency to be supplied to the drive circuits 50a to 50c at a frequency set in advance according to the magnetic material, for example, 21 kHz.

The controller 45 controls the heating power by changing the on duty (on/off ratio) of the switching element of the inverter circuit 23. Thereby, the heating object 5 placed on the top plate 4 is inductively heated.

When the load determining unit 46 determines that no load is placed, the controller 45 stops the operation of the drive circuit 50 that drives one of the heating coils determined to have no load placed thereabove.

As described above, in Embodiment 1, when the material of the heating object 5a placed above the inner-peripheral heating coil 111 is a magnetic material and the material of the heating object 5a placed above the intermediate heating coil 112 includes a non-magnetic material, the controller 45 operates the drive circuits 50a and 50b and stops the operation of the drive circuit 50c. Furthermore, the controller 45 controls such that the frequency of the high-frequency current to be supplied to the intermediate heating coil 112 from the drive circuit 50b is higher than the frequency of the high-frequency current to be supplied to the inner-peripheral heating coil 111 from the drive circuit 50a.

Therefore, when the heating object 5a made of a composite material is inductively heated, the induction heating suitable for the material of the heating object 5a can be performed, thereby preventing unevenness in heating temperature.

For example, when the high-frequency current is supplied to the outer-peripheral heating coil 113 to inductively heat the outer peripheral portion of the heating object 5a, electric power is hard to be input to the heating object 5a from the outer-peripheral heating coil 113, resulting in a reduction in heating efficiency. This is because the outer peripheral portion in the bottom surface of the heating object 5a is curved, causing a distance between the outer-peripheral heating coil 113 and the heating object 5a to be increased toward the outer peripheral end of the heating object 5a.

Therefore, when the controller 45 stops the operation of the drive circuit 50c that drives the outer-peripheral heating coil 113, unnecessary electric power is not input to the curved outer peripheral portion in the bottom surface of the heating object 5a, thereby preventing reduction in heating efficiency. Since the outer peripheral portion in the bottom surface of the heating object 5a is curved, the food materials are scarcely placed on the outer peripheral portion, and there is little need to perform the induction heating by the outer-peripheral heating coil 113, resulting in no reduction in usability.

Modified Example 1

According to the operations described above, when the material of the heating object 5a placed above the inner-peripheral heating coil 111 is a magnetic material and the material of the heating object 5a placed above the intermediate heating coil 112 includes a non-magnetic material, the controller 45 operates the drive circuits 50a and 50b and stops the operation of the drive circuit 50c. The following operations may be performed instead of or added to the above-described operations.

As illustrated in FIG. 7 described above, when the heating object 5a made of a composite material is placed on the heating zone of the induction heating cooker 100, the load determining unit 46 determines that the magnetic material is placed above the inner-peripheral heating coil 111. Furthermore, the load determining unit 46 determines that the material of the heating object 5a placed above the outer-peripheral heating coil 113 is a non-magnetic material.

When the material of the heating object 5a placed above the inner-peripheral heating coil 111 is a magnetic material and the material of the heating object 5a placed above the outer-peripheral heating coil 113 includes a non-magnetic material, the controller 45 stops the operation of the drive circuit 50c.

Such an operation enables the state in which the heating object 5a made of a composite material is placed to be determined with good accuracy. For example, when the magnetic material 6 is placed on almost the entire surface above the intermediate heating coil 112 and the non-magnetic outer peripheral portion is placed above the outer-peripheral heating coil 113, the load determining unit 46 determines that the magnetic material is placed above the intermediate heating coil 112. Even in such a case, the controller 45 can stop the operation of the drive circuit 50c, and the induction heating suitable for the material of the heating object 5a made of a composite material can be performed.

Modified Example 2

According to the operations described above, when the material of the heating object 5a placed above the inner-peripheral heating coil 111 is a magnetic material and the material of the heating object 5a placed above the intermediate heating coil 112 includes a non-magnetic material, the controller 45 operates the drive circuits 50a and 50b and stops the operation of the drive circuit 50c. The following operations may be performed instead of the above-described operations.

When the material of the heating object 5a placed above the inner-peripheral heating coil 111 is a magnetic material and the material of the heating object 5a placed above the intermediate heating coil 112 and the outer-peripheral heating coil 113 includes a non-magnetic material, the controller 45 allows the drive circuit 50a, the drive circuit 50b, and the drive circuit 50c to operate.

Furthermore, the controller 45 controls such that the frequency of the high-frequency current to be supplied to the intermediate heating coil 112 from the drive circuit 50b and the frequency of the high-frequency current to be supplied to the outer-peripheral heating coil 113 from the drive circuit 50c are higher than the frequency of the high-frequency current to be supplied to the inner-peripheral heating coil 111 from the drive circuit 50a. For example, the controller 45 sets the frequency of the high-frequency current to be supplied to the inner-peripheral heating coil 111 from the drive circuit 50a at a frequency set in advance in accordance with the magnetic material, for example, 23 kHz. The controller 45 sets the frequency of the high-frequency current to be supplied to the intermediate heating coil 112 from the drive circuit 50b and the frequency of the high-frequency current to be supplied to the outer-peripheral heating coil 113 from the drive circuit 50c at a frequency set corresponding to the non-magnetic material, for example, 90 kHz.

Furthermore, the controller 45 controls such that electric power to be supplied to the outer-peripheral heating coil 113 is smaller than electric power to be supplied to the inner-peripheral heating coil 111 and the intermediate heating coil 112. For example, the controller 45 controls electric power by changing the on duty (on/off ratio) of the switching element of the inverter circuit 23. Here, electric power to be supplied to the outer-peripheral heating coil 113 is half or less of the maximum electric power.

Thus, the heating suitable for the material of the outer peripheral portion of the heating object 5a can be performed by supplying the high-frequency current set corresponding to the non-magnetic material to the outer-peripheral heating coil 113. Electric power (the heating power) to be input to the outer peripheral portion of the heating object 5a is reduced, thereby suppressing a lowering in heating efficiency.

Embodiment 2

In Embodiment 2, an inverter circuit using a full-bridge circuit will be described. The following description will focus on differences from Embodiment 1, and the same parts as those of Embodiment 1 described above will be denoted by the same reference signs.

(Configuration)

Figure 9:
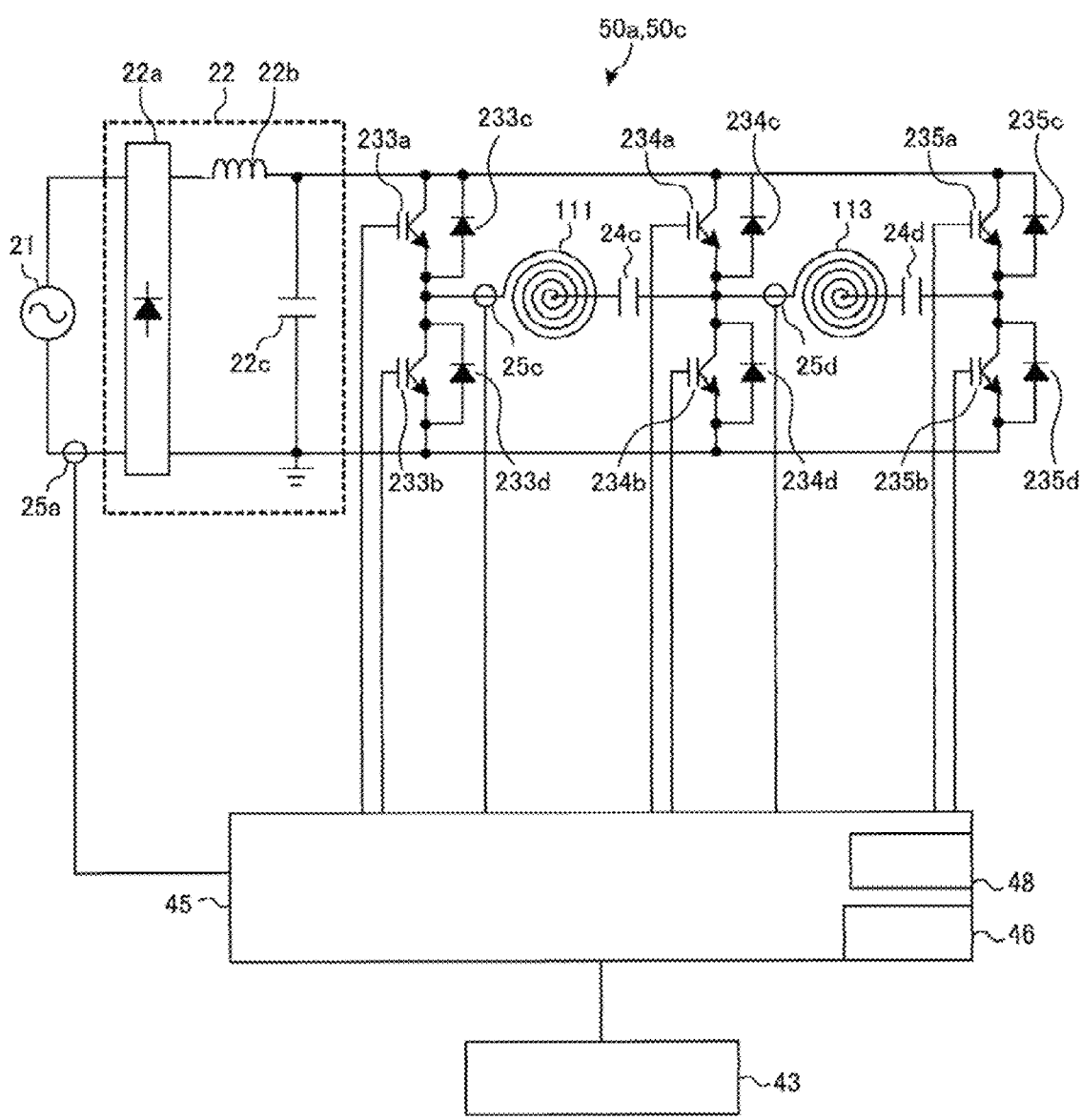
FIG. 9 is a diagram illustrating drive circuits of an induction heating cooker according to Embodiment 2.

FIG. 9 is a diagram illustrating drive circuits of an induction heating cooker according to Embodiment 2. FIG. 9 illustrates a configuration of the drive circuit 50a and the drive circuit 50c.

As illustrated in FIG. 9, each of the drive circuit 50a and the drive circuit 50c includes three arms each including two switching elements (IGBTs) connected in series with each other between positive and negative buses, and the diodes each connected in inverse parallel to corresponding one of the switching elements. Hereinafter, among the three arms, one arm is referred to as a common arm, and the two other arms are respectively referred to as an inner-peripheral heating coil arm and the outer-peripheral heating coil arm.

The common arm is an arm connected to the inner-peripheral heating coil 111 and the outer-peripheral heating coil 113, and includes an IGBT 234a, an IGBT 234b, a diode 234c, and a diode 234d.

The inner-peripheral heating coil arm is an arm connected to the inner-peripheral heating coil 111, and includes an IGBT 233a, an IGBT 233b, a diode 233c, and a diode 233d.

The outer-peripheral heating coil arm is an arm connected to the outer-peripheral heating coil 113, and includes an IGBT 235a, an IGBT 235b, a diode 235c, and a diode 235d.

The IGBT 234a and the IGBT 234b of the common arm, the IGBT 233a and the IGBT 233b of the inner-peripheral heating coil arm, and the IGBT 235a and the IGBT 235b of the outer-peripheral heating coil arm are driven to be turned on and off with drive signals output from the controller 45.

The controller 45 outputs drive signals for alternately turning on and off the IGBT 234a and the IGBT 234b of the common arm such that the IGBT 234b is deactivated while the IGBT 234a is activated and the IGBT 234b is activated while the IGBT 234a is deactivated.

Similarly, the controller 45 outputs drive signals for alternately turning on and off the IGBT 233a and the IGBT 233b of the inner-peripheral heating coil arm, and the IGBT 235a and the IGBT 235b of the outer-peripheral heating coil arm.

In this manner, the common arm and the inner-peripheral heating coil arm form a full-bridge inverter for driving the inner-peripheral heating coil 111. In addition, the common arm and the outer-peripheral heating coil arm form a full-bridge inverter for driving the outer-peripheral heating coil 113.

The inner-peripheral heating coil arm corresponds to a "first arm" according to the present invention, the common arm corresponds to a "second arm" according to the present invention, and the outer-peripheral heating coil arm corresponds to a "third arm" according to the present invention.

A load circuit that includes the inner-peripheral heating coil 111 and a resonant capacitor 24c is connected between an output point (a connection point between the IGBT 234a and the IGBT 234b) of the common arm and an output point (a connection point between the IGBT 233a and the IGBT 233b) of the inner-peripheral heating coil arm.

A load circuit that includes the outer-peripheral heating coil 113 and a resonant capacitor 24d is connected between the output point of the common arm and an output point (a connection point between the IGBT 235a and the IGBT 235b) of the outer-peripheral heating coil arm.

The coil current flowing through the inner-peripheral heating coil 111 is detected by a coil current detecting unit 25c. The coil current detecting unit 25c detects, for example, a peak of the electric current flowing through the inner-peripheral heating coil 111, and outputs a voltage signal corresponding to the peak value of the heating coil current, to the controller 45.

The coil current flowing through the outer-peripheral heating coil 113 is detected by a coil current detecting unit 25d. The coil current detecting unit 25d detects, for example, a peak of the electric current flowing through the outer-peripheral heating coil 113, and outputs a voltage signal corresponding to the peak value of the heating coil current, to the controller 45.

The controller 45 inputs the drive signals having a high frequency to the switching elements (IGBTs) of each arm depending on electric power (the heating power) to be input, to adjust the heating output. To adjust the heating output, the frequencies of the drive signals of the respective arms are the same, and electric power supplied to each of the coils is adjusted by controlling the phase difference between the drive signals to the common arm as references and the drive signals to the inner-peripheral heating coil arm and the outer-peripheral heating coil arm. The on-duty ratios of the drive signals of the respective arms are also the same.

Figure 10:
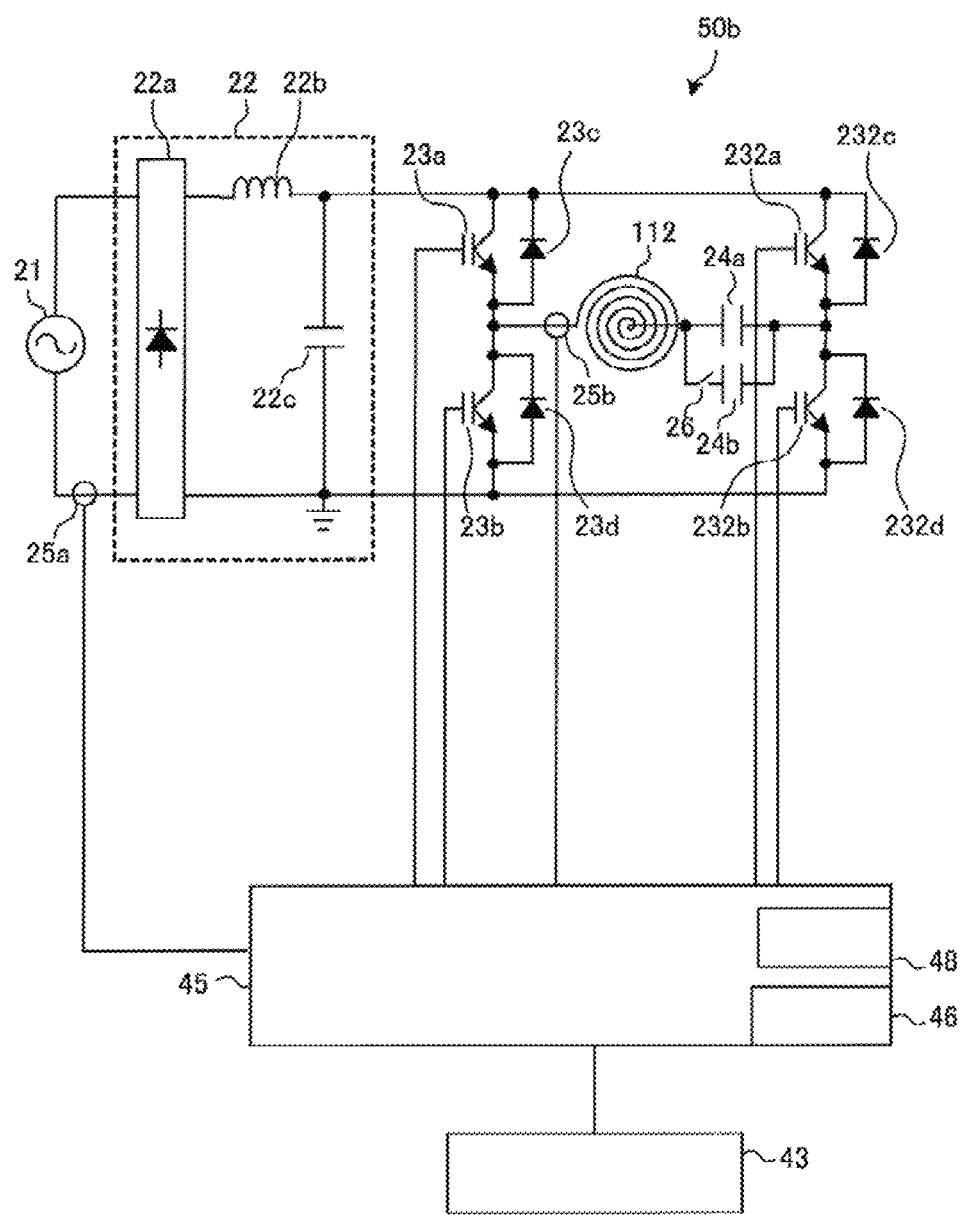
FIG. 10 is a diagram illustrating a drive circuit of the induction heating cooker according to Embodiment 2.

FIG. 10 is a diagram illustrating a drive circuit of the induction heating cooker according to Embodiment 2.

FIG. 10 illustrates a configuration of the drive circuit 50b.

As illustrated in FIG. 10, the drive circuit 50b is formed as a full-bridge inverter circuit, in which IGBTs 232a and 232b serving as switching elements and diodes 232c and 232d serving as flywheel diodes are additionally connected to the inverter circuit 23 in FIG. 4.

The controller 45 outputs drive signals for driving switching elements (IGBTs 23a, 23b, 232a, and 232b) of the inverter circuit 23, and sets the frequency of the high-frequency current to be supplied to the intermediate heating coil 112, similarly as in the above-described operations in Embodiment 1.

The drive circuit 50b includes the resonant capacitor 24a and the resonant capacitor 24b that form a resonant circuit together with the intermediate heating coil 112. The resonant capacitor 24b is connected in parallel relative to the resonant capacitor 24a through a switchover switch 26. The resonant capacitor 24b is connected in parallel to the resonant capacitor 24a when the switchover switch 26 is turned on, and the connection of the resonant capacitor 24b is released when the switchover switch 26 is turned off. More specifically, when the switchover switch 26 is closed, the capacitance of each of the resonant capacitors that form the resonant circuit together with the intermediate heating coil 112 is increased. When the switchover switch 26 is opened, the capacitance of the resonant capacitor that forms the resonant circuit together with the intermediate heating coil 112 is reduced. Although not illustrated, the switchover switch 26 is switched by a signal from the controller 45.

The switchover switch 26 corresponds to a "capacitance switching unit" according to the present invention.

(Operation)

Hereinafter, a heating operation performed in a case where the heating object 5a made of a composite material is placed on the heating zone of the induction heating cooker 100, and a heating operation performed in a case where the heating object 5b formed only of a magnetic material is placed on the heating zone of the induction heating cooker 100 will be described separately.

<Heating Object 5a Made of Composite Material>

Similarly as in Embodiment 1 described above, when the material of the heating object 5a placed above the inner-peripheral heating coil 111 is a magnetic material and the material of the heating object 5a placed above the intermediate heating coil 112 includes a non-magnetic material, the controller 45 allows the drive circuits 50a and 50b to operate and stop the operation of the drive circuit 50c. More specifically, the controller 45 stops the driving of the outer-peripheral heating coil arm of the drive circuit 50c, and drives the inner-peripheral heating coil arm and the common arm of the drive circuit 50a. The controller 45 drives two arms of the drive circuit 50b.

The controller 45 controls such that the frequency of the high-frequency current to be supplied to the intermediate heating coil 112 from the drive circuit 50b is higher than the frequency of the high-frequency current to be supplied to the inner-peripheral heating coil 111 from the drive circuit 50a.

Furthermore, the controller 45 opens the switchover switch 26 of the drive circuit 50b to reduce the capacitance of the resonant capacitor that forms the resonant circuit together with the intermediate heating coil 112.

In this manner, the resonant frequency of the resonant circuit can be increased and approach the driving frequency of the drive circuit 50b, thereby improving the heating efficiency to the intermediate heating coil 112.

<Heating Object 5B Made of Magnetic Material>

Similarly as in Embodiment 1 described above, when the magnetic material is placed above the inner-peripheral heating coil 111, the intermediate heating coil 112, and the outer-peripheral heating coil 113, the controller 45 sets the driving frequency to be supplied to each of the drive circuits 50a to 50c at a frequency set in advance in accordance with the magnetic material, for example, 21 kHz.

Furthermore, the controller 45 closes the switchover switch 26 of the drive circuit 50b to increase the capacitance of each of the resonant capacitors that form the resonant circuit together with the intermediate heating coil 112.

In this manner, the resonant frequency of the resonant circuit can be decreased and approach the driving frequency of the drive circuit 50b, thereby improving the heating efficiency to the intermediate heating coil 112.

As described above, in Embodiment 2, the drive circuit 50a that drives the inner-peripheral heating coil 111 and the drive circuit 50c that drives the outer-peripheral heating coil 113 are formed as full-bridge inverter circuits that include the arms in common, respectively.

Therefore, as compared to a case where the drive circuit 50a and the drive circuit 50c are separately configured, use of common arms enables the number of IGBTs in the inverter to be reduced from eight to six, whereby the configuration cost can be reduced. In addition, the inner-peripheral heating coil 111 and the outer-peripheral heating coil 113 are driven at the same frequency or only the inner-peripheral heating coil 111 is driven, thereby preventing magnetic noise from being generated.

In Embodiment 2, when the material of the heating object 5a placed above the intermediate heating coil 112 includes a non-magnetic material, the controller 45 switches the switchover switch 26 to reduce the capacitance of the resonant capacitor.

Therefore, the resonant frequency can approach the driving frequency of the drive circuit 50b, thereby improving the heating efficiency to the intermediate heating coil 112.

Each of the switching elements (IGBTs 23a, 23b, 232a, and 232b) forming the drive circuit 50b may be formed with a wide-bandgap semiconductor made of a silicon carbide-based material or a gallium nitride-based material, for example. In the case where the switching elements are formed with wide-bandgap semiconductors, the following advantages are obtained: power supply loss of the switching elements can be reduced; and since the loss of the drive circuit is small even when the switching frequency (driving frequency) is set to be high (high speed), radiation fins of the drive circuit can be smaller, and the drive circuit can be also smaller and the cost can be reduced.

Embodiment 3

In Embodiment 3, a configuration of a conductive wire forming the heating coil will be described. The following description will focus on differences from Embodiments 1 and 2, and the same parts as those of Embodiments 1 and 2 described above will be denoted by the same reference signs.

Figure 11:
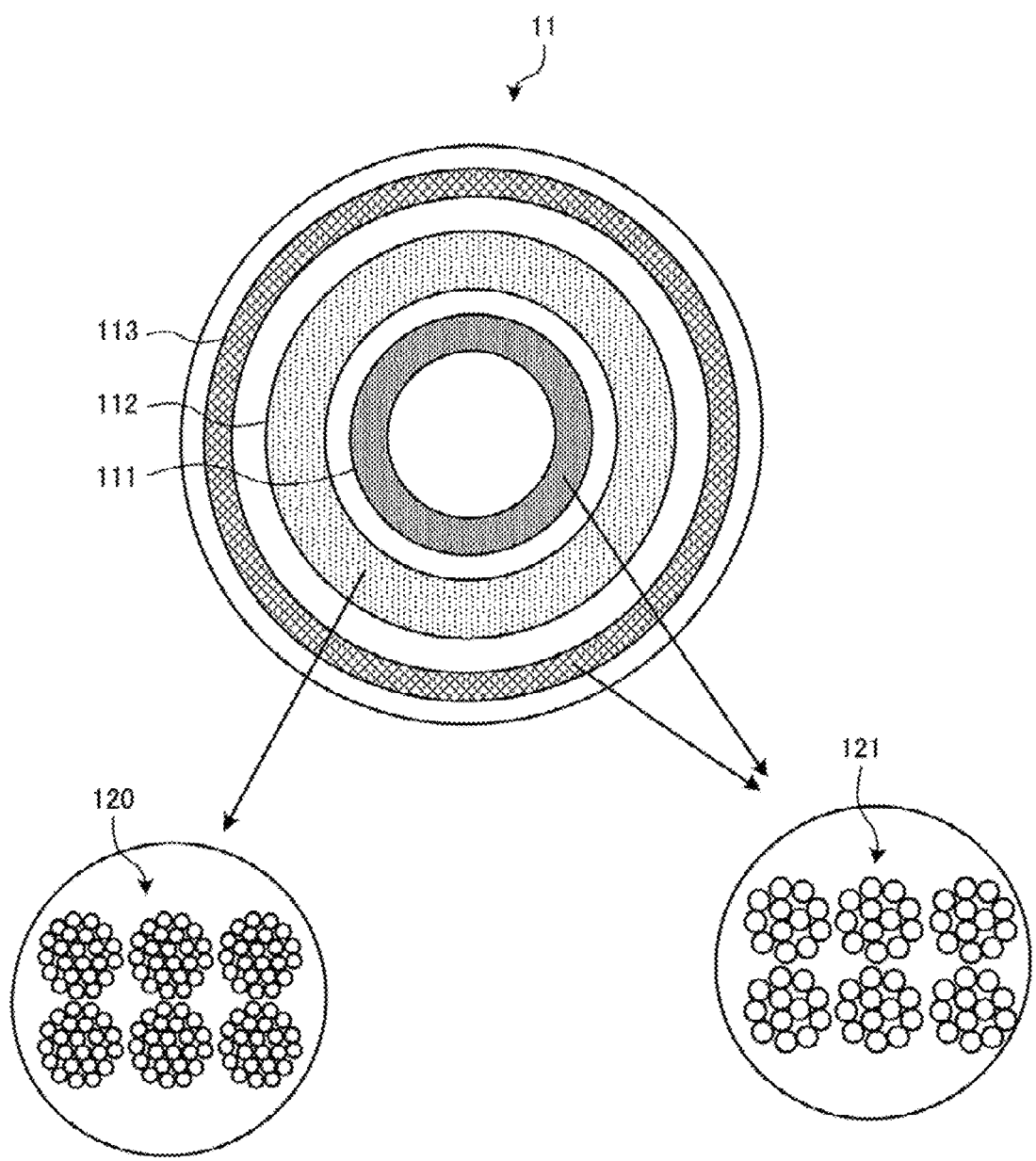
FIG. 11 is a plan view illustrating a first induction heating unit of an induction heating cooker according to Embodiment 3, and is a schematic cross-sectional view illustrating conductive wires of heating coils.

FIG. 11 is a plan view illustrating a first induction heating unit of an induction heating cooker according to Embodiment 3, and is a schematic cross-sectional view illustrating conductive wires of heating coils.

As illustrated in FIG. 11, the intermediate heating coil 112 is formed by winding a conductive wire 120 made of an arbitrary insulation-coated metal (for example, copper, aluminum, or other metals). In addition, each of the inner-peripheral heating coil 111 and the outer-peripheral heating coil 113 is formed by winding a conductive wire 121 made of an arbitrary insulation-coated metal (for example, copper, aluminum, or other metals).

The wire diameter of the conductive wire 120 of the intermediate heating coil 112 is smaller than the wire diameter of the conductive wire 121 of each of the inner-peripheral heating coil 111 and the outer-peripheral heating coil 113.

The number of turns of the conductive wire 120 of the intermediate heating coil 112 is larger than the number of turns of the conductive wire 121 of each of the inner-peripheral heating coil 111 and the outer-peripheral heating coil 113.

For example, the wire diameter of the conductive wire 121 of each of the inner-peripheral heating coil 111 and the outer-peripheral heating coil 113 is about 0.3 mm, and the wire diameter of the conductive wire 120 of the intermediate heating coil 112 is about 0.1 mm.

As described in Embodiment 1 above, the controller 45 controls such that the frequency of the high-frequency current to be supplied to the intermediate heating coil 112 from the drive circuit 50b is higher than the frequency of the high-frequency current to be supplied to the inner-peripheral heating coil 111 from the drive circuit 50a.

Therefore, the wire diameter of the conductive wire 120 of the intermediate heating coil 112 is smaller than the wire diameter of the conductive wire 121 of each of the inner-peripheral heating coil 111 and the outer-peripheral heating coil 113, and the number of turns of the conductive wire 120 of the intermediate heating coil 112 is larger than the number of turns of the conductive wire 121 of each of the inner-peripheral heating coil 111 and the outer-peripheral heating coil 113, thereby reducing the skin effect of the intermediate heating coil 112 for high-frequency heating, reducing the heat generation, and reducing the loss.

Embodiment 4

In Embodiment 4, a turn width of the heating coil will be described. The following description will focus on differences from Embodiments 1 to 3, and the same parts as those of Embodiments 1 to 3 described above will be denoted by the same reference signs.

Figure 12:
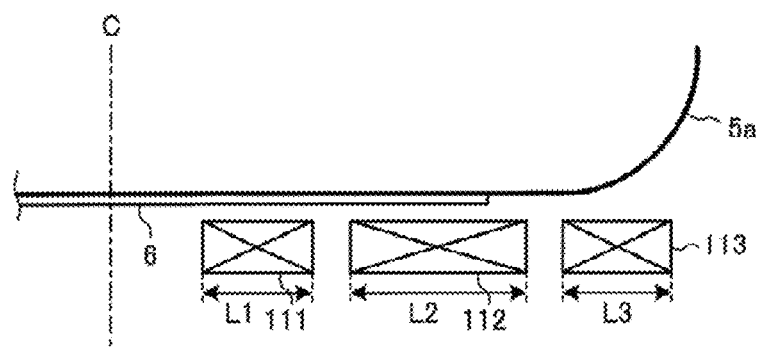
FIG. 12 is a diagram illustrating a heating object and heating coils of an induction heating cooker according to Embodiment 4.

FIG. 12 is a diagram illustrating a heating object and heating coils of an induction heating cooker according to Embodiment 4.

As illustrated in FIG. 12, a turn width L2 of the intermediate heating coil 112 is wider than a turn width L1 of the inner-peripheral heating coil 111 and a turn width L3 of the outer-peripheral heating coil 113. It should be noted that the turn width means a length between the outer periphery and the inner periphery of the heating coil that is circumferentially wound.

The heating operation in Embodiment 4 is similar to that in Embodiment 1.

Here, the heating object 5a made of a composite material in which the magnetic material 6 is attached to a non-magnetic material varies in size, and area to which the magnetic material is attached. Increasing the turn width L2 of the intermediate heating coil 112 helps to position a boundary between the magnetic material 6 and the non-magnetic material in the heating object 5a made of a composite material above the intermediate heating coil 112.

Hereinafter, examples of an outer diameter of the heating object 5a made of a composite material and an outer diameter of each heating coil, and an operation example of the induction heating cooker 100 will be described.

As the heating object 5a made of a composite material, those including a magnetic material 6 having an outer diameter (attaching diameter) of, for example, 11 cm to 17 cm, are popularly distributed in the market.

For example, an outer diameter of the inner-peripheral heating coil 111 is about 12 cm to 14 cm. For example, an outer diameter of the intermediate heating coil 112 is about 16 cm to 19 cm. A gap is provided between the inside of the intermediate heating coil 112 and the outside of the inner-peripheral heating coil 111.

In such an example, when the heating object 5a (a small pot or a small-diameter frying pan) made of a composite material having an outer diameter of about 12 cm is placed on the heating zone, for example, the load determining unit 46 determines that the magnetic material is placed above the inner-peripheral heating coil 111 and no load is placed above the intermediate heating coil 112 and the outer-peripheral heating coil 113.

In this case, the controller 45 drives only the drive circuit 50a, and stops the operations of the drive circuit 50b and the drive circuit 50c. The controller 45 operates the drive circuit 50a at a driving frequency of about twenty and several kHz, for example, 23 kHz, to heat the heating object 5a.

When the heating object 5a (a medium pot or a medium-diameter frying pan) made of a composite material having an outer diameter of about 16 cm is placed on the heating zone, for example, the load determining unit 46 determines that the magnetic material is placed above the inner-peripheral heating coil 111, the non-magnetic material is placed above the intermediate heating coil 112, and no load is placed above the outer-peripheral heating coil 113.

In this case, the controller 45 drives the drive circuit 50a and the drive circuit 50b, and stops the operation of the drive circuit 50c. The controller 45 operates the drive circuit 50a at a driving frequency of about twenty and several kHz, for example, 23 kHz, and operates the drive circuit 50b at a driving frequency set in accordance with the non-magnetic material, for example, 90 kHz.

When the heating object 5a (a large pot or a large-diameter frying pan) made of a composite material having an outer diameter of about 20 cm is placed on the heating zone, for example, the load determining unit 46 determines that the magnetic material is placed above the inner-peripheral heating coil 111, and the non-magnetic material is placed above the intermediate heating coil 112 and the outer-peripheral heating coil 113.

In this case, the controller 45 drives the drive circuit 50a and the drive circuit 50b, and stops the operation of the drive circuit 50c. The controller 45 operates the drive circuit 50a at a driving frequency of about twenty and several kHz, for example, 23 kHz, and operates the drive circuit 50b at a driving frequency set in accordance with the non-magnetic material, for example, 90 kHz.

As described above, in Embodiment 4, increasing the turn width L2 of the intermediate heating coil 112 helps to position a boundary between the magnetic material 6 and the non-magnetic material in the heating object 5a made of a composite material above the intermediate heating coil 112.

Therefore, it is possible to perform the induction heating suitable for various types of heating objects 5a that are distributed in the market. Accordingly, unevenness in heating temperature and a reduction in heating efficiency can be suppressed when various types of heating objects 5a made of a composite material are inductively heated.

Embodiment 5

In Embodiment 5, a configuration will be described, in which four heating coils are provided. The following description will focus on differences from Embodiments 1 to 4, and the same parts as those of Embodiments 1 to 4 described above will be denoted by the same reference signs.
(Configuration)
FIG. 13 is a block diagram illustrating a configuration of an induction heating cooker according to Embodiment 5.

Figure 13:
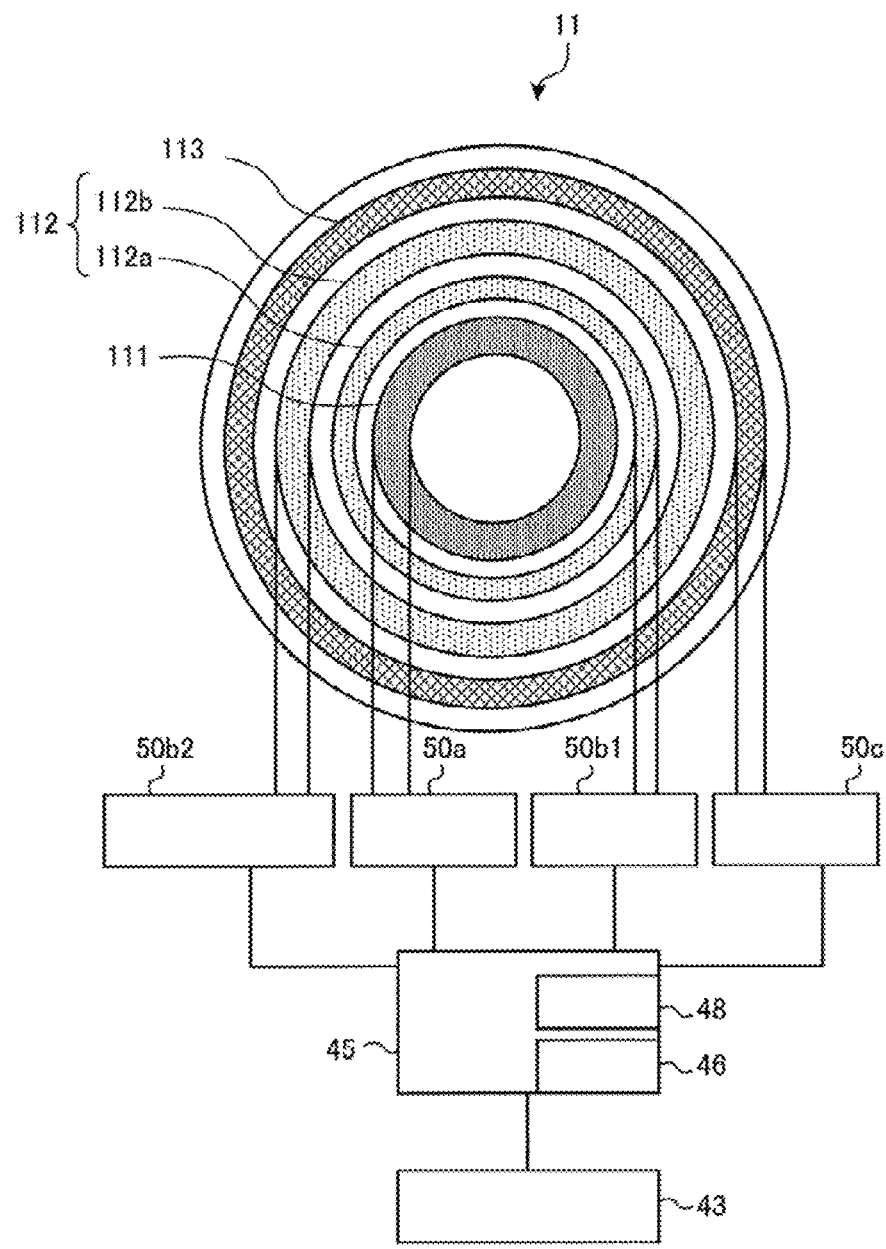
FIG. 13 is a block diagram illustrating a configuration of an induction heating cooker according to Embodiment 5.

As illustrated in FIG. 13, the intermediate heating coil 112 includes a first intermediate heating coil 112a and a second intermediate heating coil 112b. The first intermediate heating coil 112a and the second intermediate heating coil 112b have different diameters and are arranged concentrically. The second intermediate heating coil 112b is arranged outside the first intermediate heating coil 112a. Each of the first intermediate heating coil 112a and the second intermediate heating coil 112b is independently wound.

The first intermediate heating coil 112a is controlled to be driven by a drive circuit 50b1. In addition, the second intermediate heating coil 112b is controlled to be driven by a drive circuit 50b2. The configuration of each of the drive circuits 50b1 and 50b2 is similar to that of any one of Embodiments 1 to 4 described above.
(Operation)
Similarly as in Embodiment 1 described above, the load determining unit 46 determines a material of a load placed above each of the heating coils.

When the material of the heating object 5a placed above the inner-peripheral heating coil 111 is a magnetic material and the material of the heating object 5a placed above the first intermediate heating coil 112a includes a non-magnetic material, the controller 45 operates the drive circuit 50a and the drive circuit 50b1, and stops the operations of the drive circuit 50b2 and the drive circuit 50c. More specifically, the second intermediate heating coil 112b is regarded as the outer-peripheral heating coil 113 in the operation in Embodiment 21 described above, and the controller 45 stops the driving of the drive circuit 50b2 and the drive circuit 50c together with the outer-peripheral heating coil 113.

The controller 45 controls such that the frequency of the high-frequency current to be supplied to the first intermediate heating coil 112a from the drive circuit 50b1 is higher than the frequency of the high-frequency current to be supplied to the inner-peripheral heating coil 111 from the drive circuit 50a.

When the material of the heating object 5a placed above the inner-peripheral heating coil 111 and the first intermediate heating coil 112a is a magnetic material and the material of the heating object 5a placed above the second intermediate heating coil 112b includes a non-magnetic material, the controller 45 operates the drive circuit 50a, the drive circuit 50b1, and the drive circuit 50b2, and stops the operation of the drive circuit 50c.

The controller 45 controls such that the frequency of the high-frequency current to be supplied to the second intermediate heating coil 112b from the drive circuit 50b2 is higher than the frequency of the high-frequency current to be supplied to the inner-peripheral heating coil 111 from the drive circuit 50a and the frequency of the high-frequency current to be supplied to the first intermediate heating coil 112a from the drive circuit 50b1.

With such a configuration, it is possible to perform the induction heating suitable for various types of heating objects 5a that are distributed in the market. Accordingly, unevenness in heating temperature and a reduction in heating efficiency can be suppressed when various types of heating objects 5a made of a composite material are inductively heated.

In Embodiment 5, the case has been described where the number of heating coils is four, but it is not restrictive, and the embodiment may be applied to three or more arbitrary heating coils. More specifically, a plurality of heating coils are provided for one heating zone, and the controller 45 causes, among the plurality of coils, a heating coil above which the heating object 5a made of a magnetic material is placed, to function as the inner-peripheral heating coil 111. In addition, the controller 45 causes, among the plurality of heating coils, a coil that is arranged adjacent to the outside of the inner-peripheral heating coil 111 and above which the heating object 5a including the non-magnetic material is placed, to function as the intermediate heating coil 112. Furthermore, the controller 45 causes, among the plurality of coils, a heating coil that is arranged outside the intermediate heating coil 112, to function as the outer-peripheral heating coil 113.

This configuration can achieve the same effect as that achieved by each of Embodiments 1 to 5 described above. Furthermore, it is possible to perform the induction heating suitable for various types of heating objects 5a that are distributed in the market.

In Embodiments 1 to 5 described above, the case has been described where the plurality of heating coils are arranged concentrically, but it is not restrictive. For example, the outer-peripheral heating coil 113 is divided into four, to form substantially quarter arc-shaped (banana-like or cucumber-like) planar shape, and may be arranged outside the intermediate heating coil 112 generally along the outer periphery of the intermediate heating coil 112.

REFERENCE SIGNS LIST

1 First induction heating zone, 2 Second induction heating zone, 3 Third induction heating zone, 4 Top plate, 5 Heating object, 5a Heating object, 5b Heating object, 6 Magnetic material, 11 First induction heating unit, 12 Second induction heating unit, 13 Third induction heating unit, 21 Alternating-current power supply, 22 Direct-current power supply circuit, 22a Diode bridge, 22b Reactor, 22c Smoothing capacitor, 23 Inverter circuit, 23a, 23b IGBT, 23c, 23d Diode, 24a to 24d Resonant capacitor, 25a Input current detecting unit, 25b to 25d Coil current detecting unit, 26 Switchover switch, 40 Operation unit, 40a to 40c Operation unit, 41 Display unit, 41a to 41c Display unit, 43 Operation and display unit, 45 Controller, 46 Load determining unit, 48 Memory, 50 Drive circuit, 50a Drive circuit, 50b Drive circuit, 50b1 Drive circuit, 50b2

Drive circuit, 50c Drive circuit, 100 Induction heating cooker, 111 Inner-peripheral heating coil, 112 Intermediate heating coil, 112a First intermediate heating coil, 112b Second intermediate heating coil, 113 Outer-peripheral heating coil, 120 Conductive wire, 121 Conductive wire, 232a, 232b IGBT, 232c, 232d Diode, 233a, 233b IGBT, 233c, 233d Diode, 234a, 234b IGBT, 234c, 234d Diode, 235a, 235b IGBT, 235c, 235d Diode

The invention claimed is:

1. An induction heating cooker, comprising:
   a first coil;
   a second coil arranged outside the first coil;
   a third coil arranged outside the second coil;
   a first inverter circuit configured to supply a first high-frequency current to the first coil;
   a second inverter circuit configured to supply a second high-frequency current to the second coil;
   a third inverter circuit configured to supply a third high-frequency current to the third coil;
   a controller configured to control driving of the first inverter circuit, the second inverter circuit, and the third inverter circuit; and
   a load determining unit configured to determine a material of a heating object placed above each of the first coil, the second coil and the third coil,
   wherein when a material of the heating object placed above the first coil is a magnetic material and a material of the heating object placed above the second coil and the third coil includes a non-magnetic material,
   the controller operates the first inverter circuit and the second inverter circuit, and stops an operation of the third inverter circuit, and
   controls such that a frequency of the second high-frequency current is higher than a frequency of the first high-frequency current.

2. The induction heating cooker of claim 1, wherein the controller sets a frequency of the second high-frequency current at a frequency set according to the non-magnetic material.

3. The induction heating cooker of claim 1, wherein the controller controls such that the frequency of the second high-frequency current is higher than the frequency of the first high-frequency current by not less than an upper limit of an audible frequency range.

4. The induction heating cooker of claim 1, wherein the first inverter circuit comprises a full-bridge inverter circuit that drives the first coil by a first arm including two first switching elements connected in series with each other, and a second arm including two second switching elements connected in series with each other, and
   the third inverter circuit comprises a full-bridge inverter circuit that drives the third coil by the second arm, and a third arm including two third switching elements connected in series with each other.

5. The induction heating cooker of claim 1, further comprising:
   a resonant capacitor that forms a resonant circuit together with the second coil, and
   a capacitance switching unit that switches capacitance of the resonant capacitor,
   wherein when a material of the heating object placed above the second coil includes a non-magnetic material,
   the controller causes the capacitance switching unit to switch to reduce the capacitance of the resonant capacitor.

6. The induction heating cooker of claim 1, wherein
   each of the first coil, the second coil, and the third coil is formed by winding a conductive wire,
   a wire diameter of the conductive wire of the second coil is smaller than a wire diameter of the conductive wire of each of the first coil and the third coil, and
   the number of turns of the conductive wire of the second coil is larger than the number of turns of the conductive wire of each of the first coil and the third coil.

7. The induction heating cooker of claim 1, wherein a turn width of the second coil is larger than each of a turn width of the first coil and a turn width of the third coil.

8. The induction heating cooker of claim 1, further comprising:
   a top plate on which heating zones are formed, the heating zones each indicating a placement position on which the heating object is placed,
   wherein the first coil is arranged at a center of the heating zone, and
   the second coil and the third coil are arranged concentrically with the first coil.

9. The induction heating cooker of claim 1, further comprising:
   a top plate on which heating zones are formed, the heating zones each indicating a placement position on which the heating object is placed; and
   a plurality of coils provided for one of the heating zones,
   wherein the load determining unit determines a material of the heating object placed above each of the plurality of coils, and
   the controller causes, among the plurality of coils, the coil above which the heating object made of a magnetic material is placed, to function as the first coil,
   causes, among the plurality of coils, the coil that is arranged adjacent to an outside of the first coil and above which the heating object including a non-magnetic material is placed, to function as the second coil, and
   causes, among the plurality of coils, the coil that is arranged outside the second coil, to function as the third coil.

10. The induction heating cooker of claim 1, wherein in at least one of the first inverter circuit, the second inverter circuit and the third inverter circuit, switching elements include a wide-bandgap semiconductor material.

11. An induction heating cooker, comprising:
    a first coil;
    a second coil arranged outside the first coil;
    a third coil arranged outside the second coil;
    a first inverter circuit configured to supply a first high-frequency current to the first coil;
    a second inverter circuit configured to supply a second high-frequency current to the second coil;
    a third inverter circuit configured to supply a third high-frequency current to the third coil;
    a controller configured to control driving of the first inverter circuit, the second inverter circuit, and the third inverter circuit; and a load determining unit configured to determine a material of a heating object placed above each of the first coil, the second coil and the third coil, wherein, when a material of the heating object placed above the first coil is a magnetic material and a material of the heating object placed above the second coil and the third coil includes a non-magnetic material, the controller operates the first inverter circuit, the second inverter circuit, and the third inverter circuit, controls such that each of a frequency of the second high-frequency current and a frequency of the third high-frequency current is higher than a frequency of the first high-frequency current, and controls such that electric power to be supplied to the third coil is smaller than electric power to be supplied to each of the first coil and the second coil.

\* \* \* \* \*